No. 768,407. PATENTED AUG. 23, 1904.
C. W. SPICER.
INCASED UNIVERSAL JOINT.
APPLICATION FILED FEB. 15, 1904.
NO MODEL.
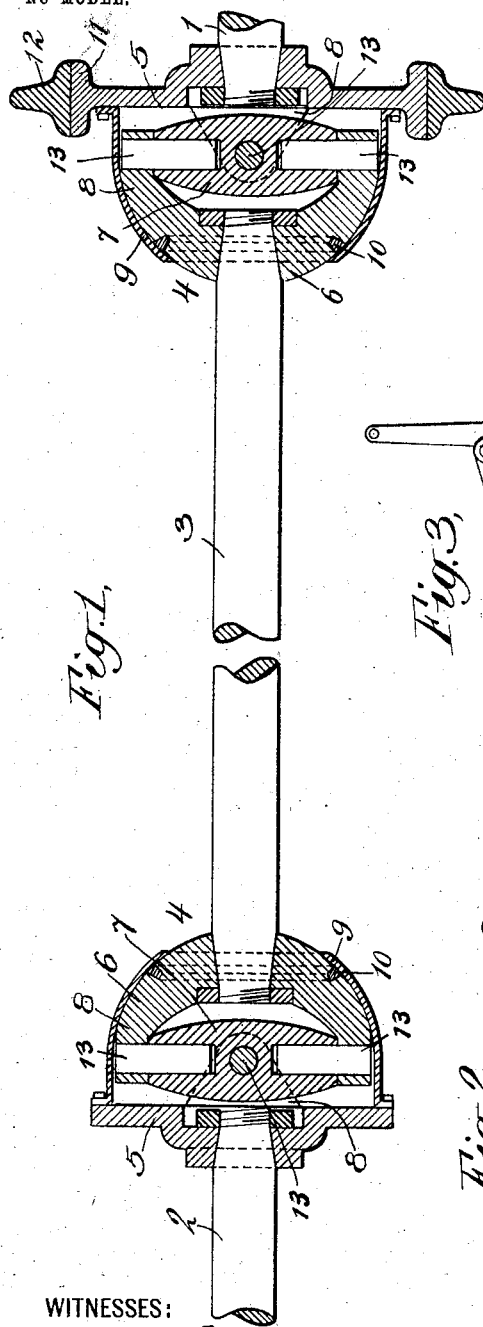
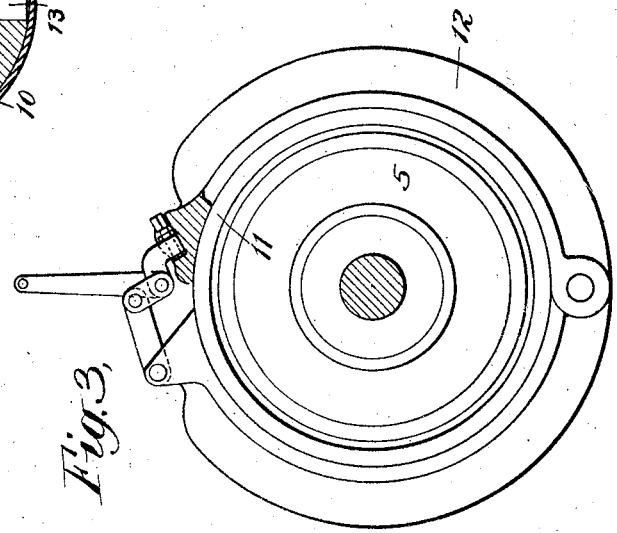
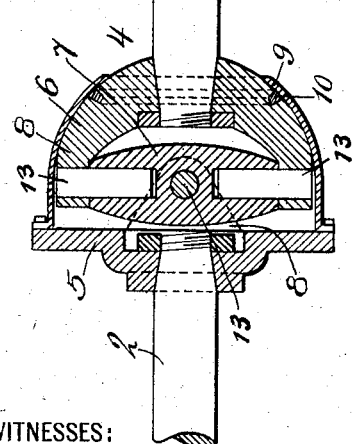
WITNESSES:
INVENTOR
Clarence W. Spicer
BY
ATTORNEYS No. 768,407. Patented August 23, 1904.

UNITED STATES PATENT OFFICE.

CLARENCE W. SPICER, OF ITHACA, NEW YORK.

INCASED UNIVERSAL JOINT.

SPECIFICATION forming part of Letters Patent No. 768,407, dated August 23, 1904.

Application filed February 15, 1904. Serial No. 193,496. (No model.)

*To all whom it may concern:*

Be it known that I, CLARENCE W. SPICER, a citizen of the United States, residing at Ithaca, in the county of Tompkins and State of New York, have invented certain new and useful Improvements in Incased Universal Joints; and I do hereby declare the following to be a full, clear, and exact description of the invention, such as will enable others skilled in the art to which it appertains to make and use the same.

My invention relates to improvements in universal joints and casings therefor and to combined universal joints and brakes; and it consists in the features hereinafter described, and particularly pointed out in the claims.

The objects of my invention are to improve and simplify universal joints, to protect them from dirt, dust, and the like and to make lubrication more effective, to make the joint compact, simple, and reliable, and to facilitate the application of a brake to a shaft connected with such joints.

I will now proceed to describe my invention, with reference to the accompanying drawings, in which certain forms of universal joints and casings therefor are illustrated, and will then point out the novel features in claims.

In the said drawings, Figure 1 shows two universal joints constructed in accordance with my invention connected to shafts, the arrangement shown being one employed in transmission mechanism of automobiles. In this view the joints and their casings are shown in section. Fig. 2 shows a similar section of an alternative form of combined universal joint and casing. Fig. 3 shows a face view of the combined brake-disk and casing member, illustrating one form of brake which may be applied thereto.

Referring first to Fig. 1, said figure shows two shafts, 1 and 2, of which either may be a driving-shaft and the other a driven shaft, and an intermediate shaft 3, connected to shafts 1 and 2 by universal joints 4. The said joints are similar in construction in all respects, except that one of the joints is arranged to form part of a friction-brake. Each joint comprises, as is usual in universal joints, two shaft members 5 and 6, pivoted to an intermediate member 7, the axis of the pivot of one shaft member being at right angles to the axis of the pivot of the other shaft member.

Each of the shaft members 5 and 6 has projecting horns 8 to receive the pivots 13, which connect it to the intermediate member 7; but, whereas the rear surface of shaft member 6 is spherically curved to engage a spherically-curved casing 9 inclosing it, the member 5 is disk-shaped and is set as closely to the intermediate member 7 as it is practicable to set it without limiting unduly the angle through which the joint may transmit motion. The casing 9 is secured to this disk member 5. Said casing is provided with a polar orifice through which the shaft member 3 projects, the polar orifice being considerably larger than the said shaft, so as to permit the necessary angular play of said shaft. Packing material 10 is provided between the member 6 and the casing 9, being located in a suitable groove in one of the two coacting spherically-curved surfaces.

By forming one of the joint members 5 and 6 as a disk I am enabled not only to make the joint shorter practically than would be possible if both members of the joint would be shaped like the member 6 and adapt member 5 to have the casing secured directly to it, but also reduce materially the weight of the joint and facilitate its manufacture by reducing the number of spherical surfaces to be formed and also adapt the said member 5 to form one of the members of a friction-brake. For this latter purpose the disk member 5 may be provided with a brake-flange 11, as shown at the right of Fig. 1 and as shown in Figs. 2 and 3, with which flange a suitable brake band or strap 12 may coact.

Any suitable mechanism may be used for expanding and contracting the brake-band, the one illustrated being well known and requiring no detailed description, or instead of the brake-band I may use any other well-known device for moving friction-surfaces into or out of engagement with the said flange 11.

Universal joints of the type to which this invention relates are extensively used in the transmission mechanism of automobiles for transmitting motion from the motor to the driving-axle or counter-shaft from which the wheels are driven. The arrangement of shafts and joints shown in Fig. 1 is such an arrangement as is commonly employed in automobiles, 1 representing the shaft from the engine or speed-changing mechanism and 2 a shaft arranged to drive the driving-axle or counter-shaft. It is common to provide brakes acting upon the shaft through which power is transmitted to the wheels, and combining the brake with the universal joint avoids the necessity of providing the driving-shaft with a separate brake-drum and reduces the number of parts.

The casing 9, coacting with the spherically-curved rear surface of the shaft member 6, incloses the joint completely, preventing the entrance of dirt, dust, and the like, and also forming a reservoir for lubricant with which the joint may be kept thoroughly lubricated. All the parts of the joint, however, are readily accessible, for by unscrewing the screws which hold the casing to the member said casing may be slipped off, thus exposing the parts of the joint to view.

In terming the members 5 and 6 of the joint "shaft" members, I do not intend thereby to imply that said members must necessarily be connected to shafts. They must of course be connected to any other parts to or from which motion is to be transmitted.

The spherically-curved surface of the shaft member 6, which coacts with the casing 9, is not necessarily integral with the portion of said shaft member which engages the intermediate member 7. This is illustrated in Fig. 2, in which the portion of the shaft member coacting with the casing is a spherically-curved cap 14, arranged at the back of the main portion 15 of the shaft member 6. It is obvious, however, that the effect of this construction is precisely the same as that of the construction shown in Fig. 1.

It is obvious that my invention is susceptible of many variations and modifications, and therefore I do not limit myself to the particular details of construction illustrated and described.

What I claim is—

1. In a universal joint, the combination with an intermediate member and two shaft members, one comprising a disk having horns by which it is pivotally connected to said intermediate member, the other shaft member likewise pivotally connected to said intermediate member and having a spherically-curved rear face, of a spherically-curved casing inclosing said second shaft member and fitting closely to the spherically-curved surface thereof and having a polar orifice, said casing secured to the disk member of the joint.

2. In a universal joint, the combination with an intermediate member and two shaft members, one comprising a disk having horns by which it is pivotally connected to said intermediate member, the other shaft member likewise pivotally connected to said intermediate member and having a spherically-curved rear face, of a spherically-curved casing inclosing said second shaft member and fitting closely to the spherically-curved surface thereof and having a polar orifice, said casing secured to the disk member of the joint, and packing material interposed between said casing and said spherically-curved shaft member.

3. In a universal joint, the combination with an intermediate member and two shaft members, one comprising a disk having horns by which it is pivotally connected to said intermediate member and having also one friction-surface of a friction-brake, the other shaft member likewise pivotally connected to said intermediate member and having a spherically-curved rear face, of a spherically-curved casing inclosing said second shaft member and fitting closely to the spherically-curved surface thereof and having a polar orifice, said casing secured to the disk member of the joint.

4. In a universal joint, the combination with an intermediate member and two shaft members, one comprising a disk having horns by which it is pivotally connected to said intermediate member and having also a brake-flange, the other shaft member likewise connected to said intermediate member and having a spherically-curved rear face, of a spherically-curved casing inclosing said second shaft member and fitting closely to the spherically-curved surface thereof and having a polar orifice, said casing secured to the disk member of the joint.

5. In a universal joint, the combination with an intermediate member, and two shaft members pivoted thereto, one of said shaft members having a spherically-curved rear face, of a spherically-curved casing fitting over and coacting with said spherically-curved face and secured to the other shaft member, and having a polar orifice, said casing removable by moving it backward from the shaft member having the spherically-curved face.

In testimony whereof I affix my signature in the presence of two witnesses.

C. W. SPICER.

Witnesses:
J. A. McKinney,
Mrs. M. A. Smith.